(12) United States Patent
Anand et al.

(10) Patent No.: US 12,217,749 B1
(45) Date of Patent: Feb. 4, 2025

(54) DEVICE TARGETING FOR CONTENT

(71) Applicant: Amazon Technologies, Inc., Seattle, WA (US)

(72) Inventors: Ratika Anand, San Jose, CA (US); Zhen Hua, Santa Clara, CA (US); Trisha Hajela, Sunnyvale, CA (US); Evan Victor Chang, Millbrae, CA (US); Tom Vasella, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/547,664

(22) Filed: Dec. 10, 2021

(51) Int. Cl.
  G10L 15/22 (2006.01)
  G06F 3/14 (2006.01)
  G06F 3/16 (2006.01)
  G10L 15/18 (2013.01)

(52) U.S. Cl.
  CPC ............... G10L 15/22 (2013.01); G06F 3/14 (2013.01); G06F 3/167 (2013.01); G10L 15/1815 (2013.01); G10L 2015/223 (2013.01)

(58) Field of Classification Search
  USPC ...................................................... 704/1–504
  See application file for complete search history.

(56) References Cited

U.S. PATENT DOCUMENTS

| | | | | |
|---|---|---|---|---|
| 7,260,535 | B2* | 8/2007 | Galanes | H04M 3/4938 704/E15.045 |
| 8,165,883 | B2* | 4/2012 | Galanes | G06F 9/451 704/270.1 |
| 8,224,650 | B2* | 7/2012 | Galanes | G10L 15/26 715/239 |
| 10,365,887 | B1* | 7/2019 | Mulherkar | G06F 3/167 |
| 10,733,982 | B2* | 8/2020 | Grupen | H04L 51/02 |
| 10,896,679 | B1* | 1/2021 | Hu | G10L 15/063 |
| 11,080,336 | B2* | 8/2021 | Van Dusen | G06N 5/02 |
| 11,282,020 | B2* | 3/2022 | Panuganty | G06F 40/30 |
| 11,495,229 | B1* | 11/2022 | Hu | G06F 3/167 |
| 2004/0073431 | A1* | 4/2004 | Galanes | G06F 9/451 704/270.1 |
| 2004/0230434 | A1* | 11/2004 | Galanes | H04M 3/4938 704/270.1 |
| 2019/0213999 | A1* | 7/2019 | Grupen | G10L 15/22 |
| 2020/0034764 | A1* | 1/2020 | Panuganty | G06F 40/284 |
| 2020/0210647 | A1* | 7/2020 | Panuganty | G06N 20/10 |
| 2021/0248136 | A1* | 8/2021 | Panuganty | G06N 20/00 |

\* cited by examiner

*Primary Examiner* — Marcus T Riley

(74) *Attorney, Agent, or Firm* — K&L Gates LLP

(57) ABSTRACT

Devices and techniques are generally described for targeting of devices. In various examples, a first natural language input comprising a first request to output a response may be received by an input device. A first component may determine first data associated with the input device. A plurality of devices associated with the first data may be determined. First state data describing a state of each device of the plurality of devices may be determined. A first device of the plurality of devices may be determined as a target device for the first request based at least in part on the first state data. The first device may be different from the input device. First instructions may be sent to the first device effective to cause the first device to display the first visual content.

20 Claims, 11 Drawing Sheets

DEVICE TARGETING FOR CONTENT

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1A:
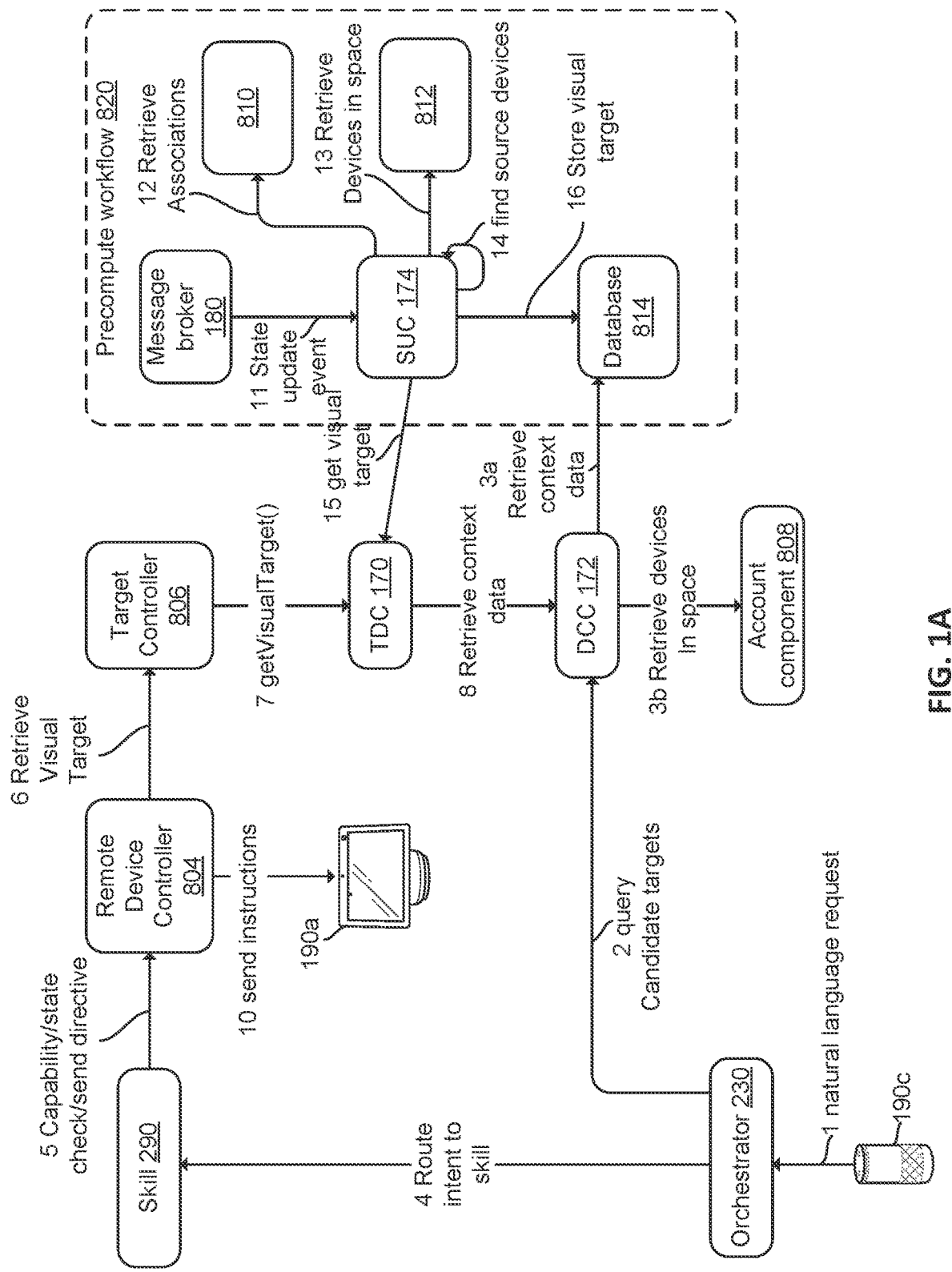
FIG. 1A is a block diagram illustrating an example of device targeting for visual content including a precompute workflow, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Internet-of-Things (IoT) and other devices are configured with network communication capability and/or other computing functions allowing these devices to send data to and/or receive data from other devices. In some examples, such devices may include voice-enabled personal assistants and/or other natural language processing interfaces that may be used to control the devices and/or otherwise interact with the devices. In some examples, the devices may be referred to as "output devices." As such devices become more and more prevalent in both the home, office, public spaces, quasi-public spaces (e.g., hotels, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device.

In some examples, natural language-based commands may be used to control output of visual content (e.g., content that includes some visual component that is output on a display) or other outputs when the natural language commands are received by a device that includes both natural language processing capability and a display for outputting the visual content. Examples of other outputs for which target devices may be determined may include turning on/off and/or adjusting lights, garage door opening/closing, temperature setting modifications, commands for autonomous robots or other systems, door lock controls, etc. Similarly, a natural language processing enabled device with no display may be 1:1 paired (or otherwise logically grouped) with another network-enabled device that includes a display. In such cases, a natural language-based command received by the natural language processing enabled device (e.g., the input device) may be used to control the paired device that includes the display to output visual content.

Physical spaces that include network communication capability (e.g., homes, offices, vehicles, etc.) may have an increasing number of network-enabled and/or natural language processing enabled devices as the number of such devices continues to increase over time. It may be possible to control output of visual content via a natural language command when the input device includes both the natural language processing capability as well as a display effective to output the content. Additionally, users may appreciate the flexibility and convenience of using a natural language command (e.g., talking, typing) to control some other device apart from the input device that detects the user's natural language command. Additionally, a user's natural language command may not explicitly (or implicitly) identify a device on which to respond. Accordingly, technology for disambiguating the device target from among multiple devices that may be present in the space may be beneficial to the user experience.

For example, a user may have several devices in the user's home. Some of the devices may include natural language processing capability, some of the devices may include displays, and some devices may include both natural language processing capability and displays. Additionally, devices may have different capabilities depending on the type of device. For example, a self-driving robot may have different capabilities relative to a smart television. A user may request "Show me my movie of the day." Note that such a request does not indicate an explicit target device by, for example, identifying a device name (e.g., such as "Dave's smart TV"). Additionally, the request does not implicitly identify a device by, for example, identifying a physical location (e.g., as in the request "Play movie in living room"). Accordingly, described herein are systems and techniques that may be used to determine a target device for visual content when there are multiple candidate devices present. Note that the initiation of target devices for visual content may be determined for natural language inputs as well as other triggering events. For example, visual content playback may be triggered by user presence detection, audio detection, etc. Additionally, described herein are systems and techniques that may be used to conserve bandwidth and processing resources and which may be used to minimize latency of response time when determining appropriate device target for visual content.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., etc. In addition, the various device targeting techniques for visual content described herein may be implemented on a natural language processing enabled device and/or on another device that is communicating on a network with one or more other network-connected devices. For example, the various content-based voice targeting techniques described herein may be executed on a smart home "hub" device configured to control various other network-connected devices on premises. In some other examples, the various device targeting techniques described herein may be executed on a mobile device (e.g., on a user's phone, laptop, etc.) or a desktop device.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

FIG. 1A is a block diagram illustrating an example of device targeting for visual content including a precompute workflow 820, in accordance with various aspects of the present disclosure. Various components of FIG. 1A may be further described below in reference to various other figures. In various examples, a device 190c may receive a natural language request to display and/or interact with visual content. Device 190c may send audio data representing the natural language request to the orchestrator component 230 (1). Orchestrator component 230 may send a request for candidate target devices (2) to device context component (DCC) 172. Device context component 172 may retrieve context data (e.g., state data 192 of FIG. 1B) and/or any precomputed target from a database 814 (3a). In various examples, device context component 172 may retrieve the potential candidate devices in the relevant space from an account component 808 (3b) or other component.

Orchestrator component 230 may route an intent (determined via NLU) to a skill component 290 (4). The skill component 290 may send a request for a capability check and/or state check to one or more remote device controllers 804 (5). In some further examples, the skill component 290 may send a directive to the remote device controller 804 to send instructions (e.g., instructions corresponding to the user intent) to the relevant device. The remote device controller 804 may send a request to retrieve the visual target (e.g., a target device for outputting visual content) to target controller 806 (6). Target controller 806 may call target determination component 170 using a getVisualTarget( ) instruction (7). Remote device controller 804 and/or target controller 806 may be part of the capability runtime service 294 of the particular skill component 290. In response, target determination component 170 may retrieve the context data from device context component 172 (8). Target determination component 170 may use the context data (and/or any precomputed visual targets retrieved from database 814) to filter the set of candidate devices in the space and to rank the devices. The top ranked device may be selected as the target device using the various heuristics described above in reference to FIG. 1. Thereafter, the remote device controller 804 may send the instructions to the selected device (in this example, device 190a) (10).

FIG. 1A also shows example processing of precompute workflow 820. In precompute workflow 820, a message component 180 may notify state update component 174 of a state update event (11). For example, state update component 174 may subscribe to a channel for devices in the relevant space. When a state change event occurs the relevant device may publish the event to a channel. The message component 180 may send a notification to state update component 174. State update component 174 may retrieve the message. State update component 174 may retrieve associations from a device grouping/pairing component 810 (12). The associations may indicate device pairings and/or device groups among the consideration set of devices. State update component 174 may retrieve the relevant devices in the space from a second component 812 (13). In various examples, state update component 174 may retrieve the devices in the space using an account ID that is associated with the device that generated the state update event to lookup devices registered to the account ID. State update component 174 may determine an input device (14). For example, Device B may be publishing an event to message component 180. Device B may be in a space (e.g., associated with the same user account) as Device A, Device C, and Device D. Devices A, C, and D are considered to be input devices (14) that may target Device B. state update component 174 may call target determination component 170 to determine a visual target for given the input device, the associations, and the devices in space (15). Target determination component 170 in turn may retrieve the context data from database 814. Target determination component 170 may return the precomputed visual target based on the input devices and capability check, devices in the space, and device types. State update component 174 may store the precomputed visual target (e.g., a target device for requests related to visual content) in database 814 (16). Thereafter, if a request is received, orchestrator component 230 may determine that a precomputed visual target is stored in database 814 and may execute a visual targeting workflow. In some examples, the precomputed visual target stored in database 814 may be used as the target device.

Figure 1B:
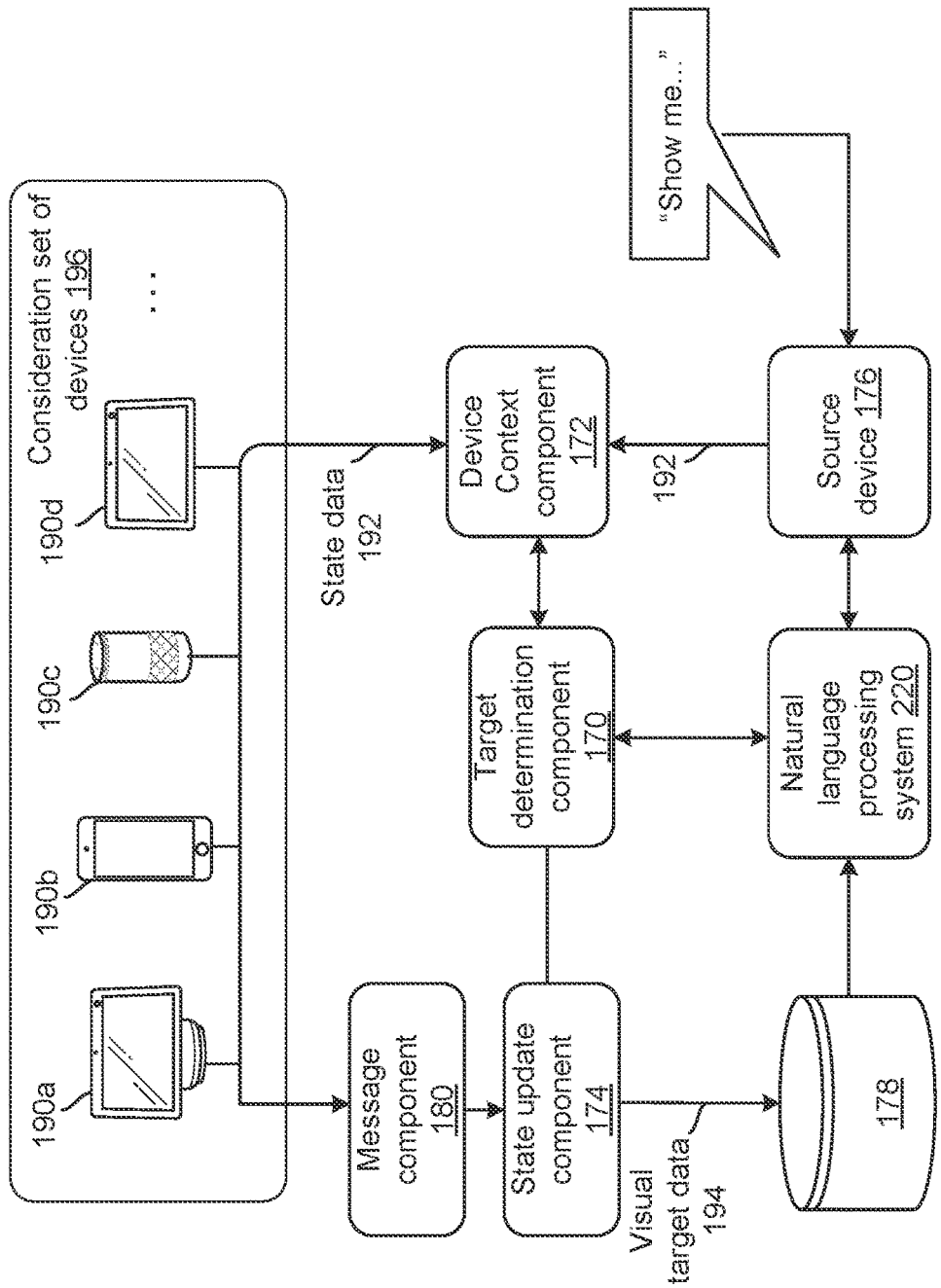
FIG. 1B is a block diagram illustrating an example system for device targeting for visual content, according to various aspects of the present disclosure.

FIG. 1B illustrates a diagram of an example environment and system 100 for device targeting for visual content, according to various aspects of the present disclosure. The system 100 may include an input device 176. Input device 176 may be a natural language processing computing device effective to receive spoken requests and/or other natural language requests via one or more microphones and/or other interfaces. The input device 176 may implement various speech processing functionality (such as ASR and/or NLU) as described in further detail below and/or may be configured with one or more other devices that may implement speech processing functionality.

In system 100, the input device 176 may be configured in communication with one or more other devices such as devices 190a, 190b, 190c, 190d, etc. In the example of FIG. 1, devices 190a, 190b, 190c, and 190d may be different types of devices. For example, device 190a may include a display screen and a motorized base effective to orient the display screen in different directions. Device 190b may be a smart phone. Device 190c may be a smart speaker that implements a virtual assistant. Device 190d may be a tablet computing device. There may be other and/or different devices in a particular environment apart from those illustrated in FIG. 1.

Device context component 172 may store device context data related to devices 190a, 190b, 190c, 190d, input device 176, etc. The context data may include state data 192 that represents a state of each of devices 190a, 190b, 190c, 190d and input device 176. Some examples of states may include visual control states, list renderer states, video playback state, inactive states (e.g., sleep mode), etc. The particular states are specific to the implementation of the visual content. Additionally, state data 192 may represent capabilities of devices 190a, 190b, 190c, 190d and input device 176. Further, in some examples, state data 192 may include device types (e.g., smart speaker, smart television, lap top, etc.). Capabilities may indicate what sorts of operations the devices may perform. For example, devices with speakers and audio drivers may be associated with an audio capability. Similarly, devices 190a, 190b, and 190d may have displays and may be associated with visual content capabilities (e.g., the ability to display visual content). However, device 190c may not include a display and may therefore not have visual content capabilities. State data 192 may represent such capabilities and/or lack of capabilities, in various examples. For purposes of the examples described below in reference to FIG. 1, it may be assumed that input device 176 is a device that does not include a display and is thus not able to display visual content.

In some examples, state data 192 may represent a list of all devices (e.g., all the devices associated with a particular user account, IP address, etc.). Further, state data 192 may indicate the current state of each device. For example, device 190a may be in a video playback state (e.g., an active state). Device 190c may be in an inactive state (e.g., a sleep mode used to conserve power). Device 190b may currently be in a voice call state, etc. Although not shown in FIG. 1, in various examples the device context component 172 may use an event-driven architecture to receive state data 192. For example, device context component 172 may subscribe to a message channel to which the various devices 190a, 190b, 190c, 190d, input device 176, etc., publish state data 192. Accordingly, device context component 172 may be notified of new messages and may store the context data (e.g., the state data 192) of such new messages in non-transitory computer-readable memory. State data 192 may also include data representing any paired or grouped devices. Further, in addition to data representing whether each device is in an active or inactive state, state data 192 may include timestamp data indicating the timing of state changes and/or activities of each device. Thereby, state data 192 may reflect the timing of various activity engaged in by each device. In some examples, these timestamps may be used to determine the most recently active device. An active device, in this context, refers to a device that is currently performing an action (e.g., a device that is displaying content, outputting audio, performing a user-requested operation, etc.). In some further examples, state data 192 may describe a type of each of the devices. The different types of devices may be manufacturer dependent. Examples may include "smart light," "smart thermostat," "appliance," "smart speaker," "smart television," etc.

In the example of FIG. 1, input device 176 may receive a spoken request to play visual content. For example, a user may speak the request "Show me a funny video." Input device 176 may receive the spoken request and may perform ASR and/or NLU processing to determine the text and/or semantic interpretation of the spoken request. In such an example, the natural language processing system 220 may be wholly or partially a component of input device 176. In some other examples, input device 176 may send data representing the spoken request to a separate natural language processing system 220 (which may be locally or remotely located, or which may have some components executed locally and some components executed remotely).

The natural language processing system 220 may send a request for a target device (e.g., a request for device target data) on which the requested action (in this case, the playback of video) be performed. The request may be sent to target determination component (TDC) 170 (e.g., a device target determination component). As previously mentioned, in this example, the input device 176 may not include a display. Target determination component 170 may request data representing a consideration set of devices 196. This may be a list of all devices associated with the relevant space. For example, input device 176 that received the spoken request may be associated with an account ID. Target determination component 170 may send the account ID as a query to a component. A list of all devices registered to the account ID may be returned to target determination component by the component. In some other examples, Target determination component 170 may query all devices communicating on a particular network with the input device 176 to determine the list of devices.

In the current example, the list of devices returned to target determination component 170 may include the devices of the consideration set of devices 196 (e.g., devices 190a, 190b, 190c, 190d, input device 176, etc.). Thereafter, target determination component 170 may send a request for state data 192 for each device in the list of devices to device context component 172. In some examples, a batch application programming interface (API) call may be used to specify multiple (e.g., all) devices in the list of devices in a single call to the device context component 172. Use of a single API call to the device context component 172 may allow the device context component 172 to retrieve the state data 192 for each relevant device and return all relevant device state data 192 in a single communication, thereby saving bandwidth and/or reducing latency that would otherwise be consumed via multiple API calls.

Upon receipt of the state data 192 for each device in the consideration set of devices 196 (including state data 192 for input device 176), target determination component 170 may determine if the input device 176 has the applicable state 192. In the current example where the user has requested playback of visual content, the input device 176 does not have the applicable state since the input device 176 does not include a display in this example. Otherwise, if the input device 176 included a display and/or otherwise has the applicable state the input device 176 may be selected as the target device. Next, target determination component 170 may determine using the state data 192 if the input device 176 is paired or grouped with a device with the applicable state (e.g., a device with a display) or if the input device 176 is in a defined space with one or more devices having the applicable state. In this example, the input device 176 may not be paired or grouped with any devices. However, there are devices in the consideration set of devices 196 having the applicable state (e.g., devices 190a, 190b, and 190d). Devices that do not include the applicable state (e.g., device 190c which does not include a display) may be filtered out of the consideration set of devices 196. Target determination component 170 may determine if the consideration set of devices 196 includes a single device with the applicable state. For example, if only one devices in the consideration set of devices 196 is powered on and includes a display, target determination component 170 may select that device as the target device. However, in the current example, devices 190*a*, 190*b*, and 190*d* may all be powered on and may all have the applicable state (e.g., each may include a display). Accordingly, target determination component 170 may next determine the most recently active endpoint. As previously described, state data 192 may include time stamps for each change in state and/or each change in device activity. Accordingly, target determination component 170 may use these timestamps to determine the most recently active device. In the current example, state data 192 may indicate that a voice call was performed on device 190*b* 2 hours ago, but that a spoken request to play a video was received by device 190*a* within the last 15 minutes. Accordingly, in the current example, device 190*a* may be determined as the device target. In various examples, the device targets may be ranked in a ranked list. Accordingly, if the top-ranked device target (e.g., device 190*a* in the current example) is not the preferred device, target determination component 170 and/or the natural language processing system 220 may select the second highest ranked target device from the ranked list, and so on. In some examples, if there are no active devices in the consideration set, the devices may be prioritized based on visual capability and/or device type. In some examples, the client calling target determination component 170 (e.g., a runtime environment of a natural language processing skill) may pass applicable filters to target determination component 170 for filtering the devices. For example, the runtime environment of the skill may specify that devices without visual capabilities and/or devices without speakers be excluded from consideration for purposes of targeting.

Device target data indicating the target device (and/or ranked list of such devices) determined by target determination component 170 may be sent to natural language processing system 220 and/or to a skill that is used to generate instructions to carry out the request. Natural language processing system 220 may use the device target data to send the instructions to initiate playback to the target device.

The example above generally describes a workflow for determining a device target for visual content in a visual content initiation context. Another workflow may be used for visual control. Visual control may refer to selection, interaction, and/or control of currently displayed content. For example, selecting from among different content displayed on a graphical user interface, scrolling, controlling a video game, and/or otherwise interacting with displayed content. In such an example, there is already at least one device that is currently displaying visual content. A user may issue visual control commands such as "Select the third menu item from the left," "Play the top movie," "Scroll down," etc. If the input device 176 has a visual state (indicated by state data 192) that indicates that a relevant graphical user interface is being displayed (e.g., a List_Renderer visual state, a UI_Controller visual state, etc.) the input device 176 may be selected as the target device. Else, if the input device is paired and/or grouped to a device with the applicable state, the most recently active device that has the relevant graphical user interface (e.g., List_Renderer visual state, UI_Controller visual state, etc.) may be selected as the target device.

In various examples, a targeting state update component 174 may be included in system 100. State update component 174 may subscribe to a channel (e.g., using an event driven architecture) on which the devices 190*a*, 190*b*, 190*c*, 190*d*, and/or input device 176 publish events (e.g., state change information). For example, each time a device 190*a*, 190*b*, 190*c*, 190*d*, or input device 176 updates a state associated with the device, state update data may be generated and message data indicating the state update event may be generated. Message component 180 may notify state update component 174 of new message data on channels to which state update component 174 subscribes.

Upon notification of a state change event, state update component 174 may call target determination component 170 with a request to have target determination component 170 determine a target device for visual content. As described above, target determination component 170 may determine a consideration set of devices 196 that may include all devices associated with an account ID (and/or otherwise associated with the relevant physical space). Target determination component 170 may precompute a target device for visual content targeting in response to the request from state update component 174 and may return the device target data to state update component 174. The device target data may be paired or grouped with an input device or may be in the same space with the input device. State update component 174 may store the device target data as visual target data 194 in a database 178.

When a new request is received via an input device 176, the natural language processing system 220 may query database 178 for any visual target data 194 that has been precomputed. If such data exists in database 178, target determination component 170 may use a visual target workflow to select the target device as the precomputed target device. In other words, device-targeting instructions that are specific to targeting visual devices (devices with displays) with visual content may be used based on the visual target data 194 in the database. Precomputing visual device targets may reduce latency. Additionally, precomputing visual targets using state update component 174 may be used during visual content continuation cases. For example, a user may have initiated visual content on device 190*a*. Event data indicating the change in state of device 190*a* will be received by state update component 174 from message component 180. In some examples, state update component 174 may send instructions to a subset of all available devices to instruct such devices to publish event data indicating state change. This may be done to limit the number of events being published and consumed by state update component 174. For example, if a new device with a display is connected to a local network and/or is registered to a particular account, state update component 174 may send an instruction to the device to publish event data indicating changes in state to message component 180. In another example, if a device that does not include a display is paired with a device that does include a display, state update component 174 may send instructions to the device without the display to publish event data indicating changes in state to message component 180. There may be other examples of cases when state update component 174 may send instructions to cause devices to publish event data apart from the specific examples described above, depending on the desired implementation.

State update component 174 may call target determination component 170 to determine the visual target data 194 (e.g., identifying device 190*a* in the current example). The visual target data 194 may be stored in database 178. Thereafter, the user may issue the spoken request "Pause." The input device 176 may not have any content that is currently in a playback state. Accordingly, the natural language processing system 220 may query database 178 to determine that visual target data 194 is stored in memory. Accordingly, the precomputed visual target (e.g., device 190*a*) may be used as the target device and instructions effective to pause the playback of the visual content may be sent from natural language processing system 220 to the precomputed visual target—device 190a.

Figure 1C:
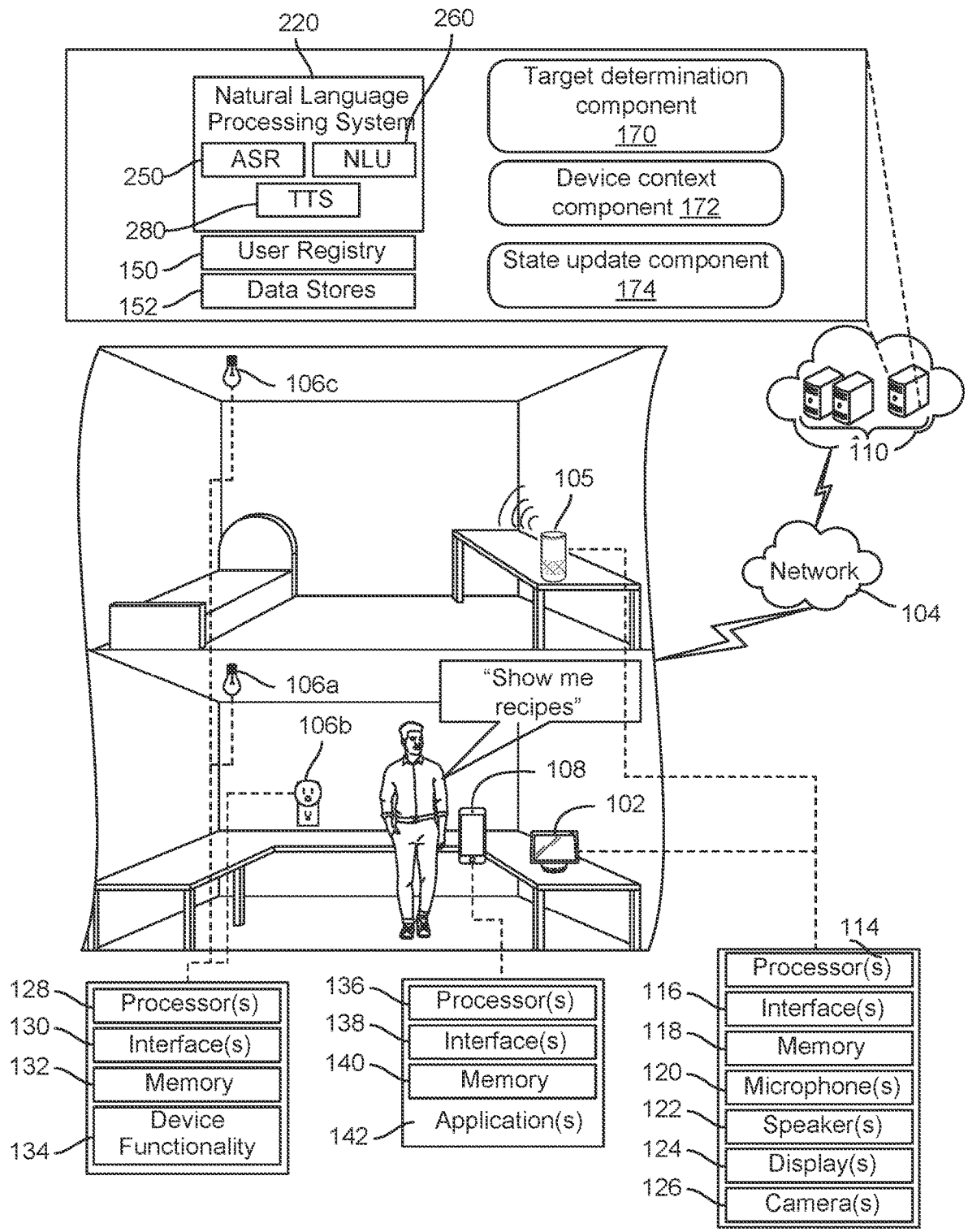
FIG. 1C is a diagram illustrating an example device targeting environment, in accordance with various aspects of the present disclosure.

FIG. 1C is a diagram illustrating an example device targeting environment, illustrating various devices in a space, in accordance with various aspects of the present disclosure. The space may include, for example, a first voice-enabled device 102 and a second voice-enabled device 105. The first voice-enabled device 105 and/or the second voice-enabled device 105 may be configured to receive user utterances and perform operations in response to such user utterances. In these examples, the first voice-enabled device 102 and/or the second voice-enabled device 105 may be "hands free" such that interactions with the devices are performed through audible requests and responses. The first voice-enabled device 102 may be located or otherwise situated in a first space. The second voice-enabled device 105 may be located or otherwise situated in a second space. As shown by way of example in FIG. 1C, the first voice-enabled device 102 is located in an "office" while the second voice-enabled device 105 is located in a "bedroom." It should be understood that the devices may be located in spaces other than those specifically mentioned in this disclosure. It should also be understood that while the spaces depicted in FIG. 1C are rooms, the spaces may be any space.

The system 100 may also include one or more accessory devices 106a-106c. The accessory devices 106a-c may be described as "smart" devices, which may have certain computing components and be configured to send and/or receive data from other devices. The accessory devices 106a-c may be, for example, light bulbs, plugs, locks, televisions, appliances, doorbells, cameras, etc. As shown in FIG. 1C, the first space in which the first voice-enabled device 102 is situated may include a first accessory device 106a, which may be a light bulb, and a second accessory device 106b, which may be a plug. The accessory devices 106a-c may be "paired" or otherwise associated with the first voice-enabled device 102 and/or the second voice-enabled device 105. As such, the accessory devices 106a-c may be configured to send data to and/or receive data from the voice-enabled devices 102, 105. Likewise, the second space in which the second voice-enabled device 105 is situated may include a third accessory device 106c, which may be a light bulb. The third accessory device 106c may be paired or otherwise associated with the voice-enabled devices 102, 105. The accessory devices 106a-c may be associated with naming indicators, which may be provided by a user of the accessory devices 106a-c, the remote system 110, and/or one or more third-party systems.

The system 100 may also include a personal device 108, which may include a mobile device such as a mobile phone. The personal device 108 may be associated with the voice-enabled devices 102, 105 and/or the accessory device 106a-c. In these examples, the personal device 108 may be configured to send data to and/or receive data from the voice-enabled devices 102, 105 and/or the accessory devices 106a-c.

The first voice-enabled device 102, the second voice-enabled device 105, the accessory devices 106a-c, and/or the personal device 108 may be configured to send data to and/or receive data from a remote system 110, such as via a network 104. In examples, one or more of the component of the system 110 may communicate directly with the remote system 110, via the network 104. In other examples, one or more of the accessory devices 106a-c may communicate with one or more of the voice-enabled devices 102, 105, and the voice-enabled devices 102, 105 may communicate with the remote system 110. Additionally, the personal device 108 may communicate directly with the voice-enabled devices 102, 105, the accessory devices 106a-c, and/or the remote system 110. In further examples, a hub device, not shown in FIG. 1B, may be utilized by the accessory devices 106a-c and/or the voice-enabled devices 102, 105 to send data to and/or receive data from other devices.

The first voice-enabled device 102 and/or the second voice-enabled device 105 may include one or more components, such as, for example, one or more processors 114, one or more network interfaces 116, memory 118, one or more microphones 470, one or more speakers 122, one or more displays 124, and/or one or more cameras 126. The microphones 470 may be configured to capture audio, such as user utterances, and generate corresponding audio data. The speakers 122 may be configured to output audio, such as audio corresponding to audio data received from another device (e.g., from a content streaming component) and/or the remote system 110. The displays 124 may be configured to present images and/or other visual content, such as images corresponding to image data received from another device and/or the remote system 110. The cameras 126 may be configured to capture images and to generate corresponding image data.

The accessory devices 106a-c may include one or more components, such as, for example, one or more processors 128, one or more network interfaces 130, memory 132, and/or device functionality components 134. The memory 132 and/or processors 128 may be utilized to cause certain operations to be performed by the accessory devices 106a-c, such as activating and/or deactivating the device functionality components 134. The device functionality components 134 may include components associated with the intended use of the accessory devices 106a-c. For example, the first accessory device 106a may be a light bulb, and in this example, the device functionality components 134 may include a filament and/or light emitting diode that may produce and/or emit light. By way of further example, the second accessory device 106b may be a wall plug, and in this example, the device functionality components 134 may include an "on/off mechanism" for causing electricity to flow or not flow to a device that is plugged in to the wall plug. It should be noted that the device functionality components 134 illustrated here are by way of example only.

The personal device 108 may include one or more components such as, for example, one or more processors 136, one or more network interfaces 138, and memory 140. The memory 140 may include one or more components, such as, for example, one or more applications 142. The applications 142 may reside on the memory 140 of the personal device 108 and/or the applications 142 may reside elsewhere, such as with the remote system 110, and may be accessible via the personal device 108. The applications 142 may be configured to cause the processors 136 to display one or more user interfaces associated with operations of the voice-enabled devices 102, 105 and/or the accessory devices 106a-c. The user interfaces may be utilized to receive inputs from the user of the personal device 108 and/or to provide content to the user.

The remote system 110 may include components such as, for example, a user registry 150, one or more data stores 152, a natural language processing system 220, target determination component 170, device context component 172, and/or state update component 174. The natural language processing system 220 may include an automatic speech recognition (ASR) component 250, a natural language understanding (NLU) component 260 (including a named entity recognition component), and/or a text-to-speech (TTS) component 280. In some examples, the natural language processing system 220 may include target determination component 170, device context component 172, and/or state update component 174 (and/or may be configured in communication with such components). In some examples, the natural language processing system 220 may include an orchestrator component effective to communicate with target determination component 170, state update component 174, and/or device context component 172. Each of the components described herein with respect to the remote system 110 may be associated with their own systems, which collectively may be referred to herein as the remote system 110, and/or some or all of the components may be associated with a single system. In examples, some or each of the components of the remote system 110 may include their own processor(s), network interface(s), and/or memory. As such, by way of example, the natural language processing system 220 may include and/or be associated with processor(s), network interface(s), and/or memory. Target determination component 170, device context component 172, and/or state update component 174 may include and/or be associated with different processor(s), network interface(s), and/or memory, or one or more of these components may utilize some or all of the same processor(s), network interface(s), and/or memory utilized by the natural language processing system 220. These components are described in detail below. Additionally, the operations and/or functionalities associated with and/or described with respect to the components of the remote system 110 may be performed utilizing web-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry 150 may be configured to identify, determine, and/or generate associations between users, user accounts, and/or devices. For example, one or more associations between user profiles and user accounts may be identified, determined, and/or generated by the user registry 150. The user registry 150 may additionally store information indicating one or more applications and/or resources accessible to and/or enabled for a given user account. Additionally, the user registry 150 may include information indicating device identifiers, such as naming identifiers, associated with a given user account, as well as device types associated with the device identifiers. The user registry 150 may also include information indicating user account identifiers, naming indicators of devices associated with user accounts, and/or associations between voice-enabled devices 102, 105 and accessory devices 106*a-c*. It should also be understood that the terms "user account" may be used to describe a set of data and/or functionalities associated with a given account identifier. For example, data identified, determined, and/or generated while using some or all of the system 110 may be stored or otherwise associated with an account identifier. Data associated with the user accounts may include, for example, account access information, historical usage data, device-association data, and/or preference data.

The data stores 152 may be configured to identify, determine, and/or generate data associated with use of the voice-enabled devices 102, 105 and/or the accessory devices 106*a-c*. For example, the voice-enabled devices 102, 105 may be utilized to cause the accessory devices 106*a-c* to operate. Usage data may be identified, determined, and/or generated that indicates some or each of these interactions. In various examples, data representing ad hoc groupings of the various devices of FIG. 1C may be stored in data stores 152. Device-state data, prior-request data, and/or other usage data may also be identified, determined, and/or generated. It should be understood that while the user registry 150 and the data stores 152 are illustrated as separate components, the user registry 150 and the data stores 152 may be the same component.

The remaining components of the remote system 110 that are illustrated in FIG. 1C will be described below by way of an example use case. It should be noted that this use case is provided for illustrative purposes, and not by way of limitation. The user may speak the request, "Show me recipes." The personal device 108 may receive the request and thus may be the input device. The audio data representing the request may be processed by natural language processing system 220 to identify that the user is requested that video recipes be played back by a recipe skill. An orchestrator of the natural language processing system 220 may call target determination component 170. Target determination component 170 may request state data from device context component 172. In various examples, target determination component 170 may use a batch API call to request state data for all devices in the space (e.g., as determined using an account ID associated with personal device 108). The device context component 172 may return state data for first voice-enabled device 102, second voice-enabled device 106, the accessory devices 106*a-c*, and/or the personal device 108. In this example, the personal device 108 has a display and is the input device. Accordingly, the personal device 108 may be selected as the device target for outputting the visual content. However, in another example, the input device may not have a display. In such an example, a determination may be made whether another device with a display is present among the consideration set of devices (e.g., the devices that are associated with the account ID and/or which are communicating on a local network). If so, and the consideration set only contains a single device with the applicable state, that device may be selected as the target device. If there are multiple devices with the applicable state, the most recently active device with the applicable state may be selected. In some further examples, there may be a precomputed device target that has been stored by state update component 174. In such examples, the precomputed device target may be selected as the device to output the visual content if the precomputed device target is the most recently active device.

As used herein, a processor, such as processor(s) 114, 128, and/or 136, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 128, 136, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 128, 136, and/or the processor(s) described with respect to the components of the remote system 110 may possess its own local memory, which also may store program components, program data, and/or one or more operating systems.

The memory 118, 132, 140, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 132, 140, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 132, 140, and/or the memory described with respect to the components of the remote system 110 may be implemented as computer-readable storage media ("CRSM"), which may be any available physical media accessible by the processor(s) 114, 128, 136, and/or the processor(s) described with respect to the components of the remote system 110 to execute instructions stored on the memory 118, 132, 140, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The network interface(s) 116, 130, 138, and/or the network interface(s) described with respect to the components of the remote system 110 may enable messages between the components and/or devices shown in system 110 and/or with one or more other remote systems, as well as other networked devices. Such network interface(s) 116, 130, 138, and/or the network interface(s) described with respect to the components of the remote system 110 may include one or more network interface controllers (NICs) or other types of transceiver devices to send and receive messages over the network 104.

For instance, each of the network interface(s) 116, 130, 138, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 130, 138, and/or the network interface(s) described with respect to the components of the remote system 110 may include a wide area network (WAN) component to enable message over a wide area network.

In some instances, the remote system 110 may be local to a space associated the first voice-enabled device 102 and/or the second voice-enabled device 105. For instance, the remote system 110 may be located within the first voice-enabled device 102 and/or the second voice-enabled device 105. In some instances, some or all of the functionality of the remote system 110 may be performed by the first voice-enabled device 102 and/or the second voice-enabled device 105. Also, while various components of the remote system 110 have been labeled and named in this disclosure and each component has been described as being configured to cause the processor(s) to perform certain operations, it should be understood that the described operations may be performed by some or all of the components and/or other components not specifically illustrated.

Figure 2:
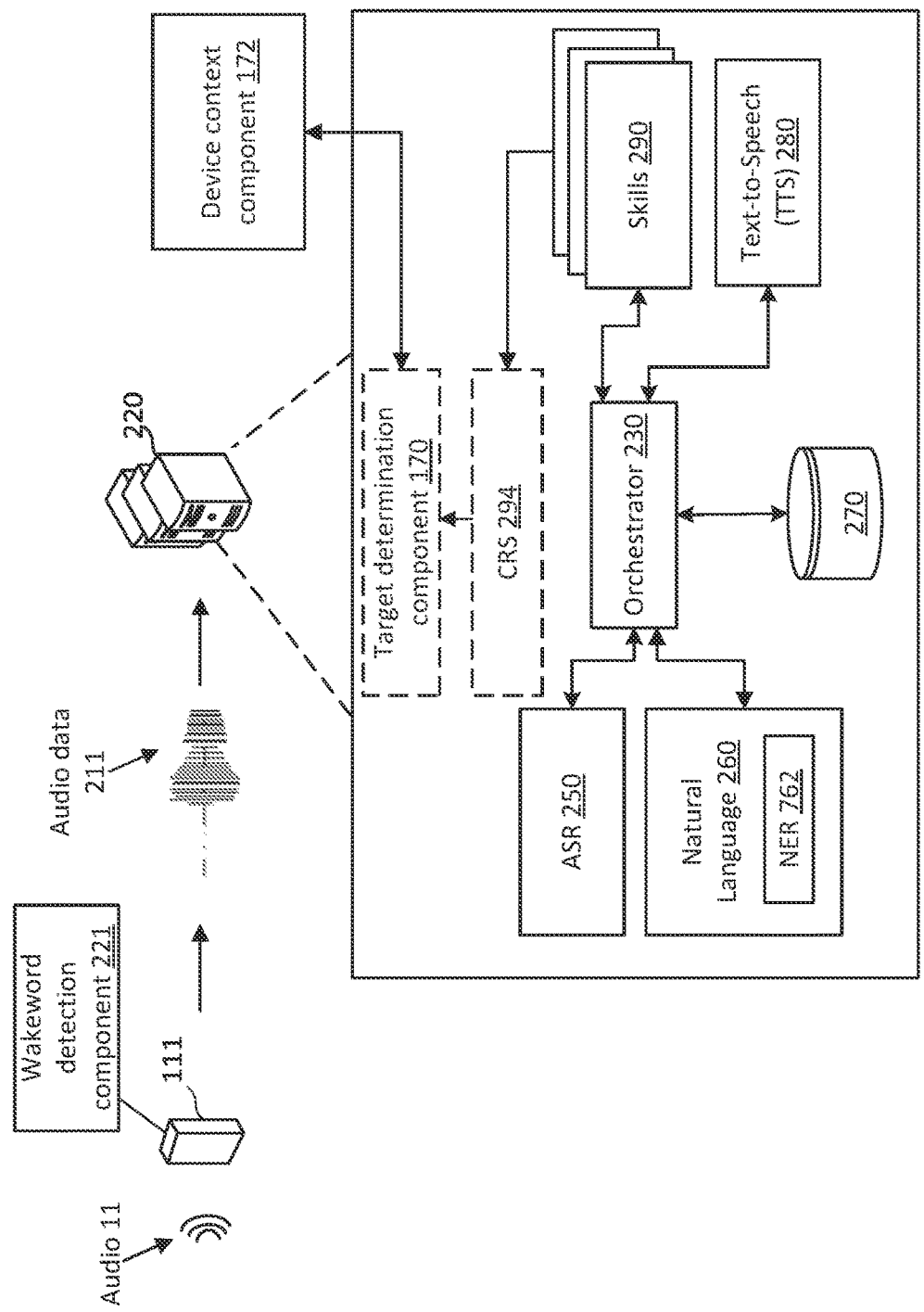
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device 120 that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request.

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill 290. As described herein, in various examples, the skill component 290 may execute a capability runtime service (CRS) 294 which may call target determination component 170 for determining a device that may be targeted for the requested action/output. If the NLU results include multiple NLU hypotheses, the orchestrator component 230 may send a portion of the NLU results corresponding to the top scoring NLU hypothesis to a skill 290 associated with the top scoring NLU hypothesis. Target determination component 170 may determine a list of devices in the space by calling an account component (or other component) that may associate an account ID with a list of devices registered to that account. For example, the input device upon which the current utterance was received may be associated with an account ID. The account ID may be provided to the account component and the account component may perform a lookup (e.g., in profile storage 270) to determine the devices registered to that account. The account component may return the list of devices to target determination component 170. Target determination component 170 may call device context component 172 to determine state data for each of the devices. Although not shown in FIG. 2, in some examples, device context component 172 and/or target determination component 170 may determine if a precomputed visual target is stored in memory. If so, the precomputed visual target may be used. If not, the device context component 172 may provide state data for all devices in the space to target determination component 170 and target determination component 170 may use the various workflows described above to determine a ranked list of target devices on which to perform the requested action.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill component 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3A:
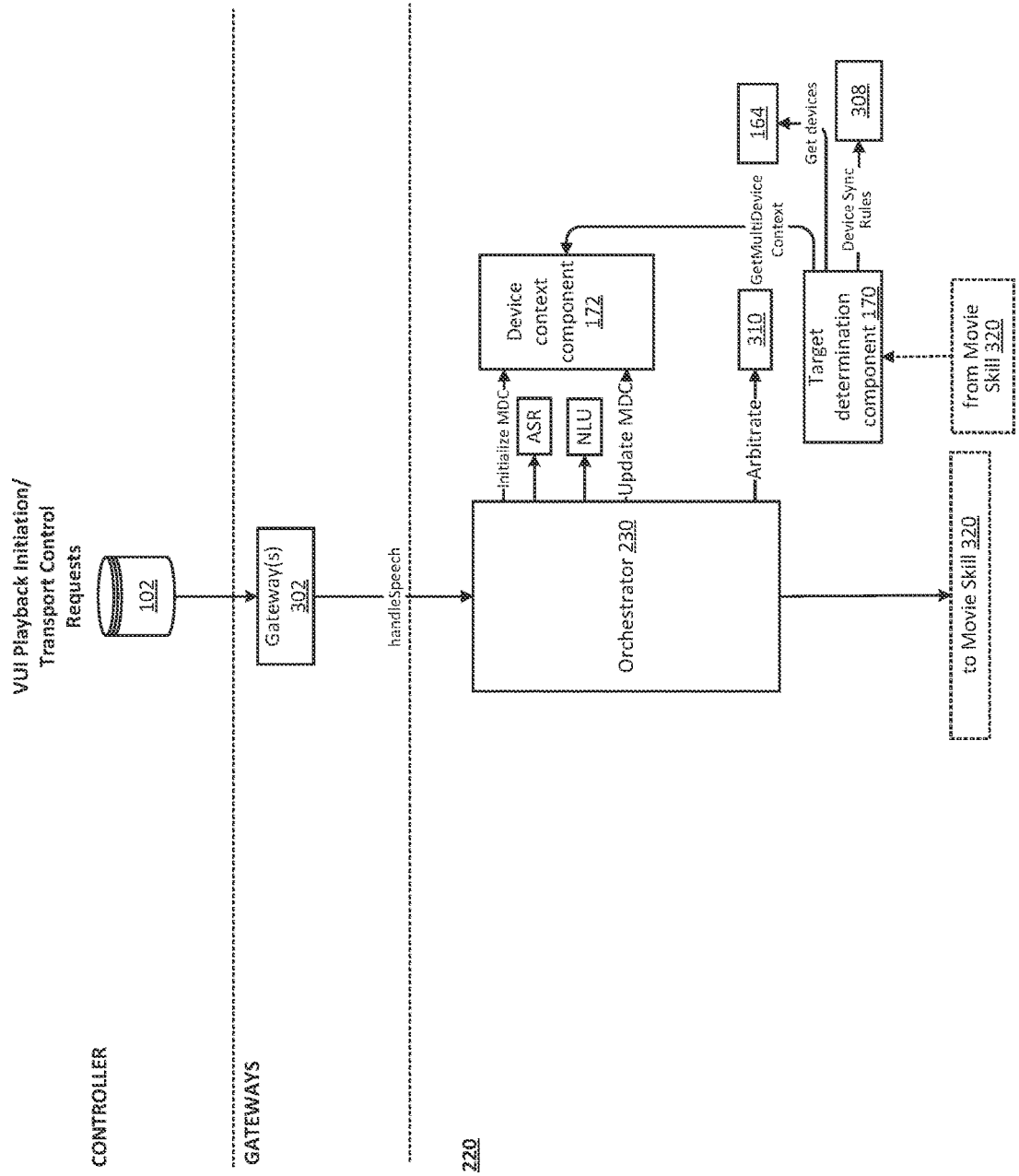
FIGS. 3A and 3B depict a flow diagram illustrating a process flow that may be used for device targeting for visual content, in accordance with various embodiments described herein.
Figure 3B:
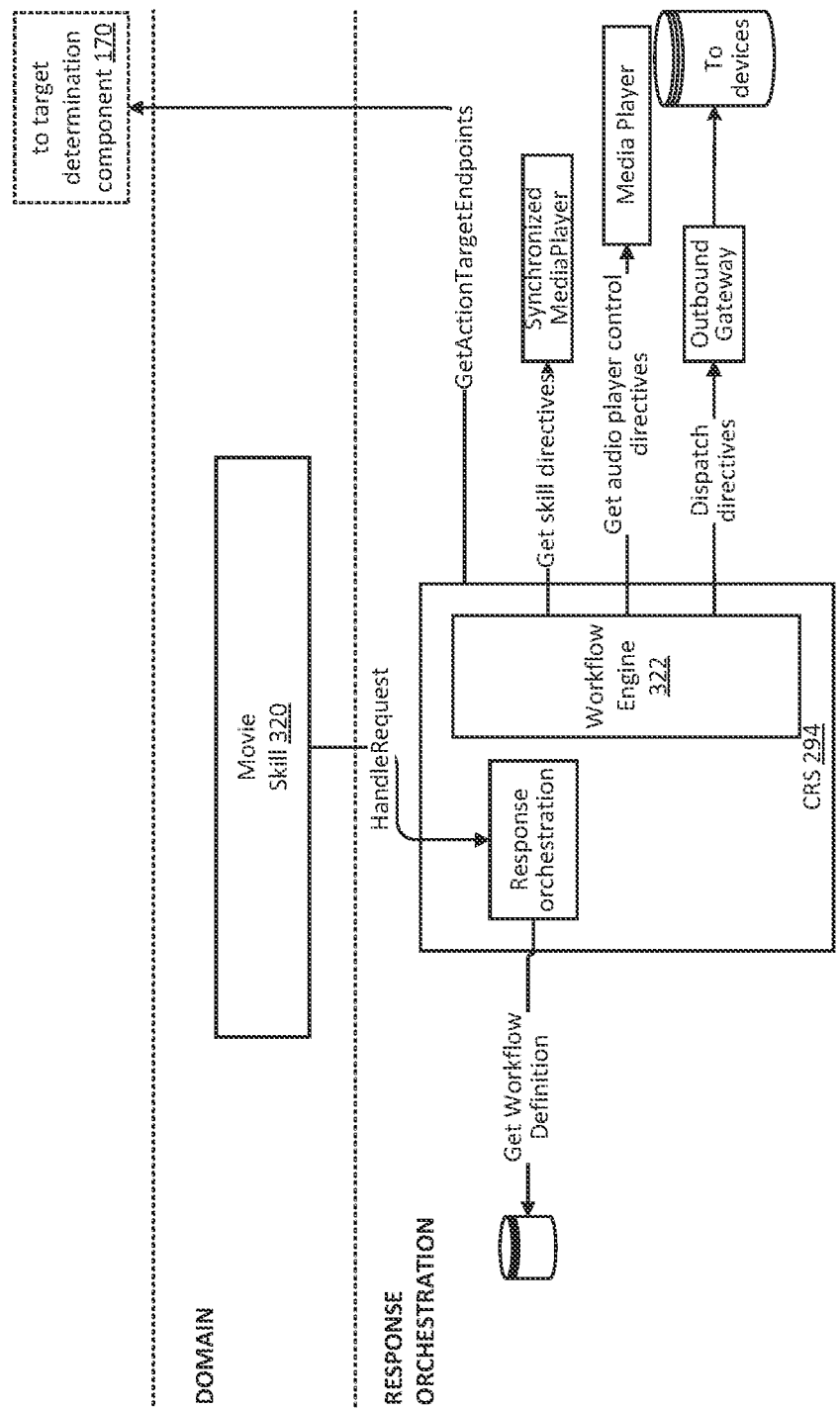

FIGS. 3A and 3B depict a flow diagram illustrating a process flow that may be used for device targeting for visual content, in accordance with various embodiments described herein. In various examples, a voice user interface initiation request may be received from a device, such as first voice-enabled device 102. In the example, the request may be a request to initiate movie playback. However, the request may not explicitly or implicitly identify any particular device on which to initiate movie playback. The audio data representing the spoken request may be sent from the controller device (e.g., the first voice-enabled device 102) to one or more gateway devices 302 used to control access to the natural language processing system 220.

Orchestrator component 230 may receive the audio data and may initialize a device context component 172. The device context component 172 may aggregate different signals consumed by target determination component 170 to run various heuristics to determine the appropriate endpoint device(s) (e.g., device targets) for performing the user-requested action. As previously described, the signals may generally be referred to as state data (e.g., device state of the input device as well as device state of other candidate devices for taking the requested action), proximity signals (e.g., determining the user's proximity to a particular device (e.g., based on detected power levels and/or signal-to-noise ratios of the user request (when detected by multiple devices)), contextual data (e.g., time of day, weather, etc.), device type data, device activity data, etc. In various examples, target determination component 170 may receive a list of relevant devices by querying an account component 164. However, in other examples, the device context component 172 may instead retrieve the list of devices associated with the account and/or the space. In some examples, target determination component 170 may query a synchronization component 308 to determine synchronization rules in the event that synchronized playback among multiple devices is requested.

Orchestrator component 230 may send the audio data to ASR component (e.g., ASR component 250), which may generate text data or other ASR output data representing the user request. The ASR output data may be sent to NLU (e.g., NLU component 260) to perform NER processing (e.g., by NER component 762) and in order to determine intent data representing the semantic intent of the request.

A dynamic routing component 310 may use the ASR output data, the intent data, the slot data, context data, and/or the audio data to determine a routing plan for the user request. The routing plan may comprise a ranked list of candidate skills for performing an action in response to the request. The dynamic routing component 310 may employ a variety of statistical machine learning models to select the best candidate skills for processing the user request. In the current example, the dynamic routing component 310 may select the movie skill 320 for processing the user request (e.g., the user request to control music playback on the ad-hoc group of devices). In this example, the movie skill 320 may be an example of a skill that may take action on the intent data and/or slot data output by NLU. For example, the movie skill 320 may generate computer-executable instructions that may be effective to cause the relevant devices (identified by the device Ids output by target determination component 170) to perform the user-requested action.

The movie skill 320 may retrieve the device Ids determined using target determination component 170 and may send instructions to a response orchestration component to perform the requested action. The response orchestration component may retrieve the specified workflow definition and may execute the workflow in a runtime environment such as CRS 294. The workflow may be executed by the workflow engine 322. The workflow may include getting the relevant skill directives from the media player streaming the movie/video, getting the relevant control directives (e.g., volume up/down, pause, resume, fast forward, etc.) from a media player executing on the relevant devices, etc. The directives relevant to the received request may be sent to the device Ids identified using the target determination component 170 via an outbound gateway.

Figure 4:
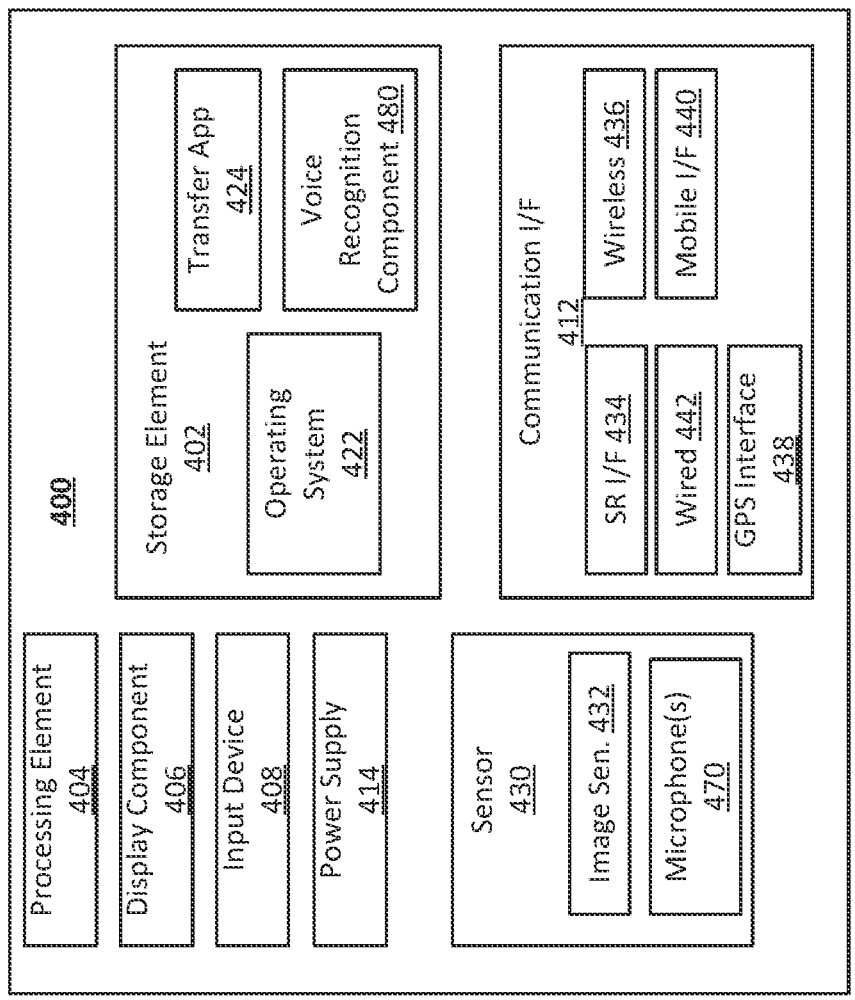
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise target determination component 170 and/or state update component 174.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
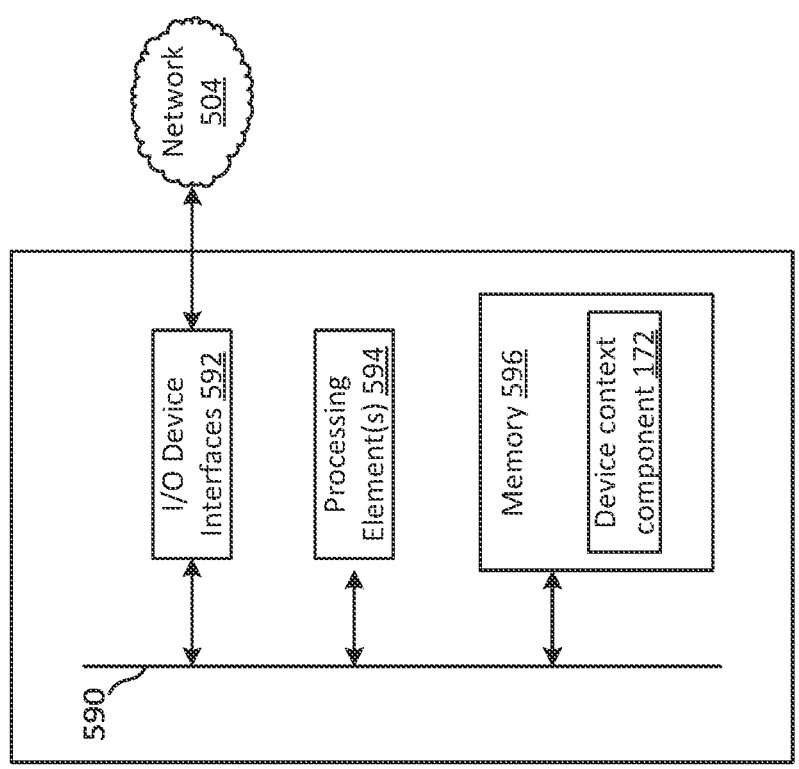
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1B), when loaded from memory 596. In various further examples, memory 596 may be effective to store instructions effective to program controllers/processors 594 to perform the various techniques described above in reference to FIGS. 1-3. Accordingly, in FIG. 5, device context component 172 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
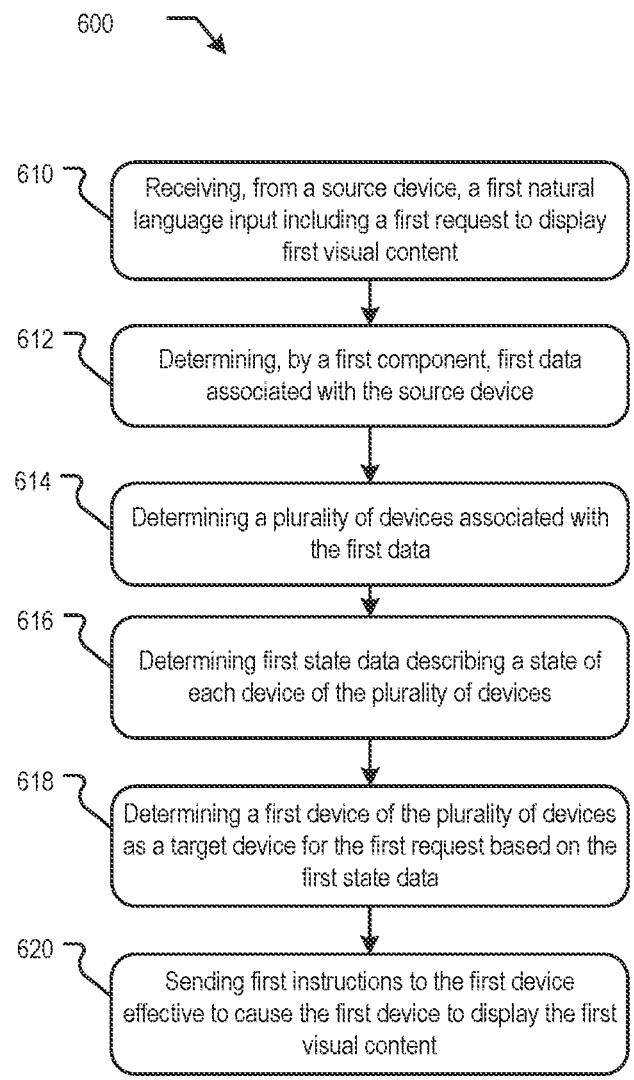
FIG. 6 depicts a flow chart showing an example process for device targeting for visual content, in accordance with various aspects of the present disclosure.

FIG. 6 depicts a flow chart showing an example process 600 for device targeting for visual content, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which a first natural language input may be received from an input device. The first natural language input may include a first request to display first visual content. For example, a user may request that some image or video be displayed on a screen. However, the user may not explicitly or implicitly identify a particular device on which to output the visual content.

Processing may continue at action 612, at which a first component may determine first data associated with the input device. In one example, target determination component 170, orchestrator component 230, device context component 172 and/or some other component may determine account identifier data associated with the input device. In some other examples, space identifier data associated with the input device may be determined. In general, the first data may be data that can be used to determine the list of devices that are potential targets for servicing the user request. Typically, the devices are located within a relevant physical space (such as within a user's home, office, vehicle, etc.). However, this need not be the case. In some examples, the devices could be spread among different physical locations.

Processing may continue at action 614, at which a plurality of devices associated with the first data may be determined. In various examples, the first data determined at action 612 may be used to determine a plurality of devices that are associated with the first data. In some examples, a lookup table may store the first data (e.g., account identifier data) in association with a list of devices (e.g., devices registered to the account). In some other examples, the first data may be an IP address or other data affiliated with a LAN on which the input device is communicating. The first data may be used to determine other devices associated with the first data (e.g., the same IP address).

Processing may continue at action 616, at which first state data describing a state of each device of the plurality of devices may be determined. For example, target determination component 170 may call device context component 172 to determine state data 192 for each device of the plurality of devices determined at action 614. In various examples, a batch API call may be used to reduce latency. The device context component 172 may retrieve the relevant state data for each device in the batch API call using separate processing threads for to retrieve each devices state data. However, in order to maintain quality of service, the state data retrieval for each device may be associated with a respective timeout counter (e.g., a timeout value). If the timeout counter expires (e.g., the amount of time since generating the processing thread exceeds the timeout value), the state data for the particular device may not be returned when the device context component 172 returns the device state data for the plurality of devices to target determination component 170.

Processing may continue at action 618, at which a first device of the plurality of devices may be determined as a target device for the first request based on the first state data. In various examples, the state data may be used to determine which devices include a display, whether each device is active/inactive, the relative recentness of activity on each device, etc. In addition, the state data may indicate whether any devices are currently paired to or grouped with the input device. This information may be processed using a visual content initiation workflow to both filter out inapplicable devices and to rank the candidate set of devices (post filtering). In some examples, different device types may be associated with different priority levels. In at least some further examples, the first device may have been precomputed using state update component 174 based on an event associated with a state change of the first device.

Processing may continue at action 620, at which first instructions may be sent to the first device. The first instructions may be effective to cause the first device to display the first visual content (e.g., the requested movie, video, image, etc.). If the user thereafter interrupts and requests that content be played back on a different device, the next device in the ranked list may be targeted. In some cases, the user may clarify by explicitly specifying the target device in the follow up request. In such cases, the explicitly-named device may be selected as the target (if the explicitly-named device offers the required functionality).

Figure 7:
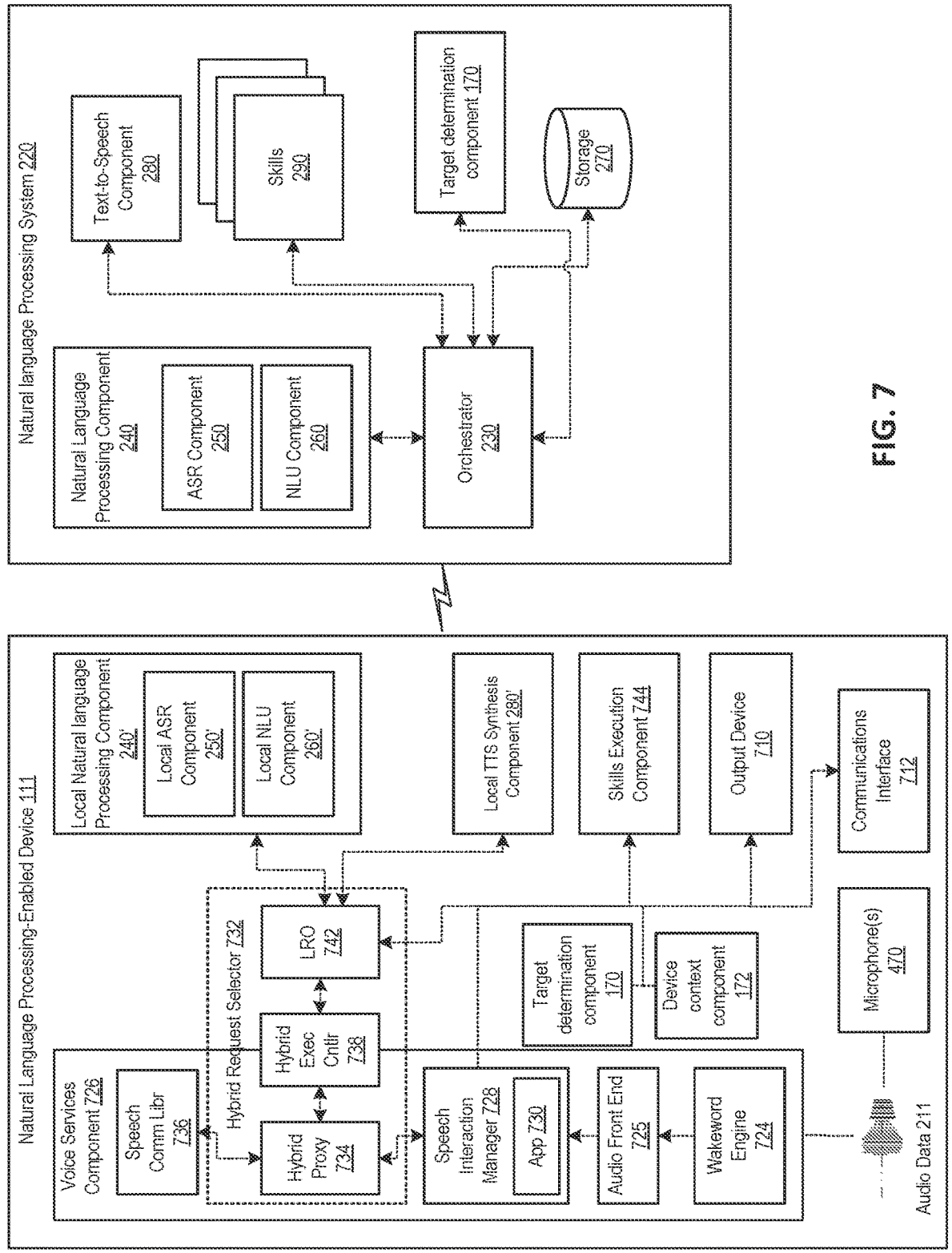
FIG. 7 is a block diagram illustrating a natural language processing-enabled device and a natural language processing management system, in accordance with embodiments of the present disclosure.

FIG. 7 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices 120. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 710 (e.g., speakers, displays, and/or other network connected devices among network-connected devices 120) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with target determination component 170 and device context component 172. Accordingly, the device 111 may be used to determine which on which devices control instructions should be sent based on the various device state data and/or any precomputed visual targets. State data returned from device context component 172 may be used to filter and rank the list of devices that are present in the space.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 710 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 470 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 220. For example, the HP 734 may be configured to pass messages between the SIM 728 and the SCL 736 (such as by passing events and instructions there between), and to send messages to/from a hybrid execution controller component (HEC) 738 of the hybrid request selector component 732. For instance, command data received from the natural language processing system 220 can be sent to the HEC 738 using the HP 734, which sits in the path between the SCL 736 and the SIM 728. The HP 734 may also be configured to allow audio data 211 received from the SIM 728 to pass through to the natural language processing system 220 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the local natural language processing component 240' about the availability of new audio data 211 that represents user speech, and to otherwise initiate the operations of the local natural language processing component 240' when new audio data 211 becomes available. In general, the hybrid request selector component 732 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 742 may interact with a skills execution component 744 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 220 (e.g., via the SCL 736), and the HP 734 may also input the audio data 211 to the local natural language processing component 240' by routing the audio data 211 through the HEC 738 of the hybrid request selector 732, whereby the LRO 742 notifies the local natural language processing component 240' of the incoming audio data 211. At this point, the hybrid request selector 732 may wait for response data from the natural language processing system 220 and/or the local natural language processing component 240'.

The local natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the target determination component 170, device context component 172, and/or state update component 174 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Figure 8:
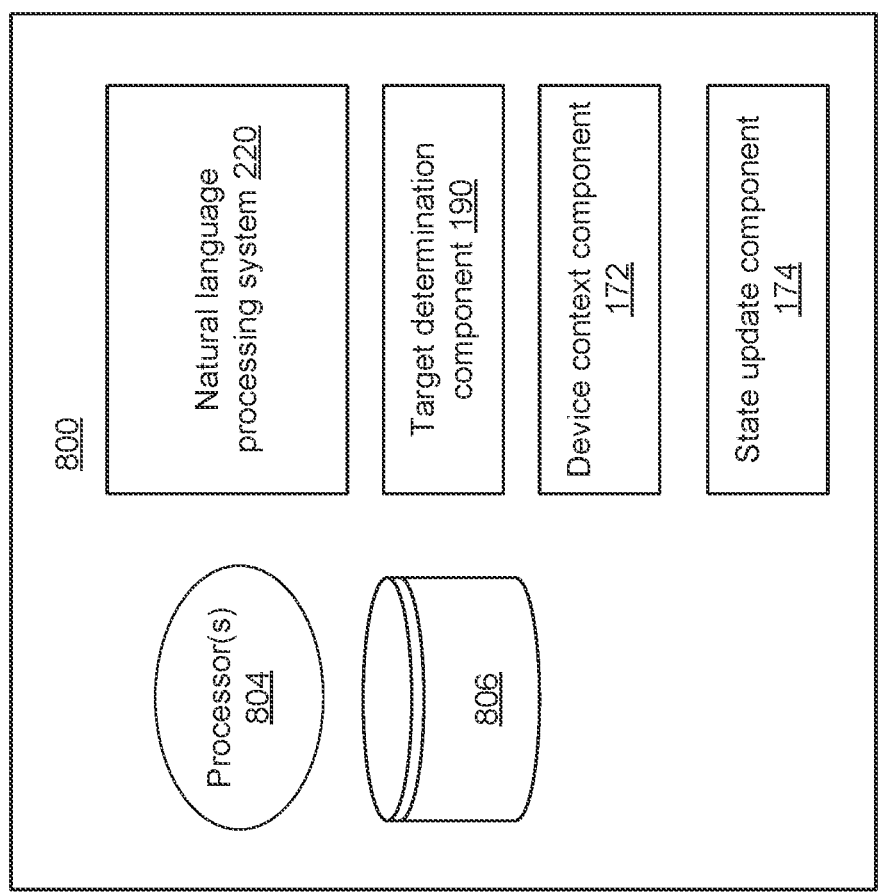
FIG. 8 is a block diagram of an example natural language processing enabled device effective to determine device targeting for requests, in accordance with various aspects of the present disclosure.

FIG. 8 is a block diagram of an example natural language processing enabled device 800 effective to determine device targeting for requests, in accordance with various aspects of the present disclosure. The components depicted in the example natural language processing enabled device 800 are shown by way of example only. Additional components may be included in natural language processing enabled device 800 in various implementations. For example, the natural language processing enabled device 800 may include a communication interface, an operating system, an input/output interface, a power supply, a display, speakers, etc. Additionally, in some examples, one or more components may be omitted from natural language processing enabled device 800. For example, in some cases, device context component 172 may be deployed on a different device with which natural language processing enabled device 800 communicates (e.g., over a network).

Natural language processing enabled device 800 may include one or more processors 804 and non-transitory computer-readable memory 806. In various examples, the non-transitory computer-readable memory 806 may store instructions that may be executed to perform one or more of the various techniques described herein.

In an example, natural language processing enabled device 800 may include natural language processing system 220. Accordingly, natural language processing enabled device 800 may be effective to receive natural language requests (e.g., text, speech). In some cases, natural language processing enabled device 800 may therefore be an input device at which a natural language request related to visual content (or other request types) is received. Additionally, as natural language processing enabled device 800 includes target determination component 190, natural language processing enabled device 800 may determine a target for a given natural language request (e.g., among devices in the space associated with the natural language processing enabled device 800). In this context, the space refers to network-enabled devices that are associated with the same account identifier, IP address, and/or are otherwise affiliated with the natural language processing enabled device 800 and/or in the same physical place as the natural language processing enabled device 800.

Additionally, as the example natural language processing enabled device 800 includes the state update component 174, the natural language processing enabled device 800 may precompute targets that may be used when a continuation request is received (e.g., "Alexa, continue.") so that the precomputed target for the previous state change event (e.g., initiation of playback on the particular target device) may be used for the continuation request, rather than re-computing the appropriate target device.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   receiving, from an input device, a first natural language input comprising a first request to display first visual content;
   determining that the input device is associated with a first account;
   determining, using a natural language understanding component, first intent data representing a semantic interpretation of the first request, the first intent data effective to cause the first visual content to be displayed;
   sending, by a target determination component to a device context component, identifier data identifying the first account;
   receiving device context data from the device context component, wherein the device context data comprises a list of devices associated with the first account, first data representing a first output device of the list of devices being active, second data indicating that a second output device of the list of devices includes a display, and third data indicating a state of a third output device of the list of devices;
   determining, by the target determination component using the first data, the first output device and the second output device among the list of devices that have an active state;
   determining, by the target determination component, that the first output device has been more recently active relative to the second output device; and
   sending command data to the first output device, the command data causing the first output device to display the first visual content.

2. The computer-implemented method of claim 1, further comprising:
   sending, by the device context component, the identifier data to an account component;
   receiving, by the device context component from the account component, the list of devices;
   sending, by the device context component, data identifying the list of devices in a request for the first data, the second data, and the third data; and
   receiving, by the device context component, the first data, the second data, and the third data.

3. The computer-implemented method of claim 1, further comprising:
   receiving, by a first component, state update data indicating that the first output device has paused playback of second visual content;
   sending, by the first component, a request to the target determination component to precompute visual target data;
   determining, by the target determination component, that the first output device is a visual target device;
   storing data representing the visual target device in non-transitory computer-readable memory;
   receiving a second natural language input comprising a second request to resume playback;
   retrieving the data representing the visual target device from the non-transitory computer-readable memory; and
   sending command data to the first output device, the command data causing the first output device to resume playback of the second visual content.

4. A method comprising:
   receiving, from an input device, a first natural language input comprising a first request to output a response;
   determining, by a first component, first data associated with the input device;
   determining a first output device associated with the first data;
   determining a second output device associated with the first data;
   determining first state data describing a state of the first output device;
   determining second state data describing a state of the second output device;
   determining the first output device as a target for the first request based at least in part on the first state data, wherein the first output device is different from the input device; and
   sending first command data to the first output device, the first command data causing the first output device to display first visual content.

5. The method of claim 4, further comprising:
   receiving, by a second component using an event driven architecture, message data indicating that a state of the first output device has changed;
   determining, based at least in part on the message data, visual target data identifying the first output device;

storing the visual target data in non-transitory computer-readable memory;
receiving a second natural language input comprising a second request;
determining the visual target data stored in the non-transitory computer-readable memory; and
sending second command data related to the second request to the first output device based at least in part on the visual target data.

6. The method of claim 4, further comprising:
determining second data among the first state data indicating that the first output device is paired with the input device;
determining third data among the first state data indicating the first output device includes a display; and
determining the first output device as the target for the first request further based at least in part on the second data and the third data.

7. The method of claim 4, further comprising:
determining second data among the first state data indicating a set of output devices having an applicable state to display the first visual content;
determining third data among the first state data indicating that the first output device is a most recently active output device among the set of output devices; and
determining the first output device as the target for the first request based at least in part on the third data.

8. The method of claim 4, further comprising:
receiving, from the input device, a second natural language input comprising a second request to interact with first content;
determining, by the first component, the first data associated with the input device;
determining second state data describing a current state of the input device;
determining, using the second state data, that the input device has a state indicating that a plurality of visual content items are displayed by the input device;
determining the input device as a target for the second request based at least in part on the second state data; and
sending second command data to the input device, the second command data causing an interaction with at least one of the plurality of visual content items.

9. The method of claim 4, further comprising:
detecting a state change of the second output device;
determining target data identifying the second output device based at least in part on the state change;
storing a visual target data in a non-transitory computer-readable memory;
receiving a second natural language input comprising a second request; and
determining the target for the second request by executing device-targeting command data specific to visual output devices, wherein the device-targeting command data specific to visual output devices are used based on the visual target data stored in the non-transitory computer-readable memory.

10. The method of claim 4, wherein the first data comprises account identifier data, the method further comprising:
receiving, by the first component, the first output device and the second output device as candidate output devices for the first request based at least in part on the account identifier data;
sending data identifying the first output device and the second output device to a device context component to retrieve the first state data and the second state data; and
receiving, from the device context component, the first state data and the second state data.

11. The method of claim 10, further comprising:
generating, by the device context component using the data identifying the first output device and the second output device, a first processing thread to retrieve state data for the first output device;
generating, by the device context component using the data identifying the first output device and the second output device, a second processing thread to retrieve state data for the second output device;
determining that an amount of time since generating the second processing thread has exceeded a timeout value; and
returning the first state data to the first component.

12. The method of claim 4, further comprising:
receiving, from the input device, a second natural language input comprising a second request to resume playback;
determining that second state data identifying the first output device as the target for the first request is stored in a non-transitory computer-readable memory;
selecting the first output device as the target for the second request based at least in part on the second state data; and
sending second command data to the first output device, the second command data, causing the first output device to resume playback of the first visual content.

13. A system comprising:
at least one processor; and
non-transitory computer-readable memory storing instructions that, when executed by the at least one processor, are effective to:
receive, from an input device, a first natural language input comprising a first request to output a response;
determine, by a first component, first data associated with the input device;
determine a first output device associated with the first data;
determine a second output device associated with the first data;
determine first state data describing a state of the first output device;
determine second state data describing a state of the second output device;
determine the first output device as a target for the first request based at least in part on the first state data, wherein the first output device is different from the input device; and
send first command data to the first output device, the first command data causing the first output device to display first visual content.

14. The system of claim 13, the non-transitory computer-readable memory storing further instructions that, when executed by the at least one processor, are further effective to:
receive, by a second component using an event driven architecture, message data indicating that a state of the first output device has changed;
determine, based at least in part on the message data, visual target data identifying the first output device;
store the visual target data in the non-transitory computer-readable memory;

receive a second natural language input comprising a second request;

determine the visual target data stored in the non-transitory computer-readable memory; and send second command data related to the second request to the first output device based at least in part on the visual target data.

15. The system of claim 13, the non-transitory computer-readable memory storing further instructions that, when executed by the at least one processor, are further effective to:

determine second data among the first state data indicating that the first output device is paired with the input device;

determine third data among the first state data indicating the first output device includes a display; and determine the first output device as the target for the first request further based at least in part on the second data and the third data.

16. The system of claim 13, the non-transitory computer-readable memory storing further instructions that, when executed by the at least one processor, are further effective to:

determine second data among the first state data indicating a set of output devices having an applicable state to display the first visual content;

determine third data among the first state data indicating that the first output device is a most recently active output device among the set of output devices; and determine the first output device as the target for the first request based at least in part on the third data.

17. The system of claim 13, the non-transitory computer-readable memory storing further instructions that, when executed by the at least one processor, are further effective to:

receive, from the input device, a second natural language input comprising a second request to interact with first content;

determine, by the first component, the first data associated with the input device;

determine second state data describing a current state of the input device;

determine, using the second state data, that the input device has a state indicating that a plurality of visual content items are displayed by the input device;

determine the input device as a target for the second request based at least in part on the second state data; and send second command data to the input device, the second command data causing an interaction with at least one of the plurality of visual content items.

18. The system of claim 13, the non-transitory computer-readable memory storing further instructions that, when executed by the at least one processor, are further effective to:

detect a state change of the second output device;

determine target data identifying the second output device based at least in part on the state change;

store a visual target data in the non-transitory computer-readable memory;

receive a second natural language input comprising a second request; and determine the target for the second request by executing device-targeting command data specific to visual output devices, wherein the device-targeting command data specific to visual devices are used based on the visual target data stored in non-transitory computer-readable memory.

19. The system of claim 13, wherein the first data comprises account identifier data, the non-transitory computer-readable memory storing further instructions that, when executed by the at least one processor, are further effective to:

receive, by the first component, the first output device and the second output device as candidate output devices for the first request based at least in part on the account identifier data;

send data identifying the first output device and the second output device to a device context component to retrieve the first state data and the second state data; and receive, from the device context component, the first state data and the second state data.

20. The system of claim 19, the non-transitory computer-readable memory storing further instructions that, when executed by the at least one processor, are further effective to:

generate, by the device context component using the data identifying the first output device and the second output device, a first processing thread to retrieve state data for the first output device;

generate, by the device context component using the data identifying the first output device and the second output device, a second processing thread to retrieve state data for the second output device;

determine that an amount of time since generating the second processing thread has exceeded a timeout value; and return the first state data to the first component.

* * * * *